United States Patent
Wu et al.

(10) Patent No.: US 6,462,805 B1
(45) Date of Patent: Oct. 8, 2002

(54) REVERSE-MODE DIRECT-VIEW DISPLAY EMPLOYING A LIQUID CRYSTAL HAVING A CHARACTERISTIC WAVELENGTH IN THE NON-VISIBLE SPECTRUM

(75) Inventors: Bao-Gang Wu, Amarillo, TX (US); Jianan Hou, Germantown, MD (US); Jianmi Gao, Richardson, TX (US); Yong-Jing Wang, Canyon, TX (US); Shushan Li, Amarillo, TX (US); Rui Hai Sun, Amarillo, TX (US); Gang Chen, Plano, TX (US)

(73) Assignee: Display Research, Inc., Wylie, TX (US)

( * ) Notice: Subject to any disclaimer, the term of this patent is extended or adjusted under 35 U.S.C. 154(b) by 0 days.

(21) Appl. No.: 09/874,519

(22) Filed: Jun. 4, 2001

(51) Int. Cl.$^7$ ................................. G02F 1/137
(52) U.S. Cl. ........................ 349/169; 349/175
(58) Field of Search ................ 349/169, 175, 349/113, 114, 176, 194

(56) References Cited

U.S. PATENT DOCUMENTS

| | | |
|---|---|---|
| 3,642,348 A | 2/1972 | Wysocki et al. |
| 5,437,811 A | 8/1995 | Doane et al. |
| 5,796,454 A | 8/1998 | Ma |
| 5,920,368 A | 7/1999 | Hatano et al. |
| 6,344,887 B1 | 2/2002 | Ma |

*Primary Examiner*—Kenneth Parker
(74) *Attorney, Agent, or Firm*—Burleigh & Associates; Roger S. Burleigh

(57) ABSTRACT

Disclosed are various reverse-mode direct-view liquid crystal displays employing a liquid crystal having a characteristic wavelength in the non-visible spectrum, including reflective, transmissive and reflective-transmissive mode displays. In accordance with the principles disclosed, a direct-view liquid crystal display (LCD) includes a front substantially transparent substrate, a rear substrate, and a controllable cholesteric liquid crystal (CLC) disposed between the front and rear substrates and having a characteristic wavelength to reflect non-visible spectrum; the portions of the controllable CLC can selectively exhibit a planar state or a focal-conic state, the portions of the CLC in the planar state appearing dark, and the portions of the CLC in the focal-conic state appearing bright, to an observer of the LCD. The reflective, transmissive and reflective-transmissive mode displays are derived by further combinations with linear and/or circular polarizers, reflective mirrors and/or transmissive/reflective mirrors, and a source of visible light.

16 Claims, 2 Drawing Sheets

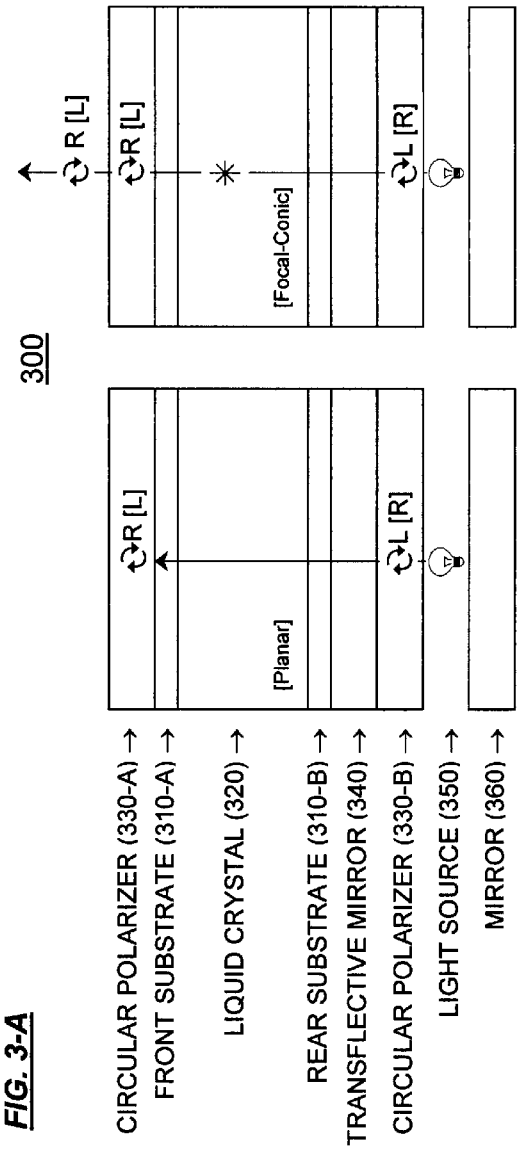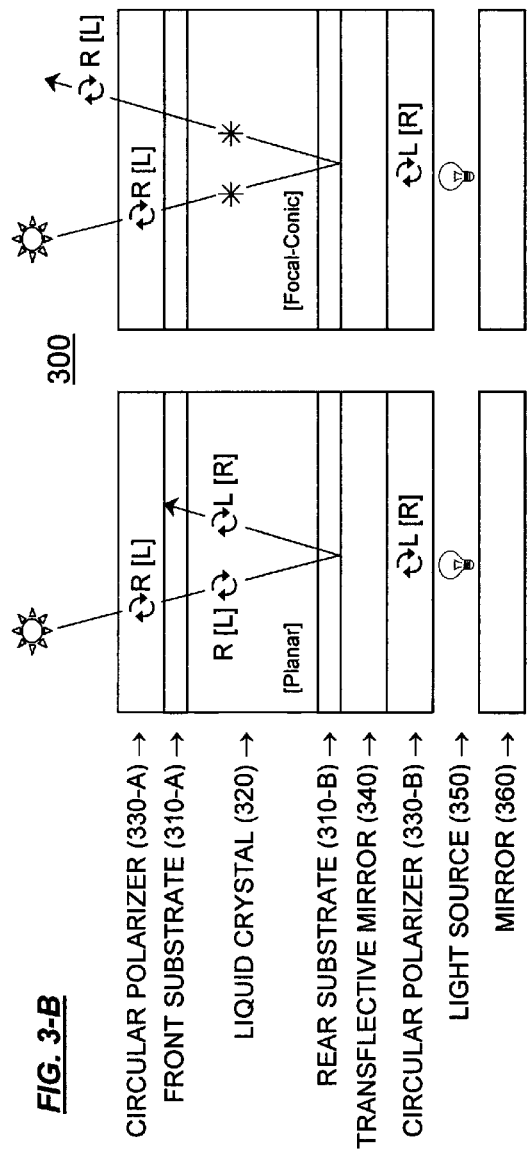
*FIG. 3-A*
*FIG. 3-B*

REVERSE-MODE DIRECT-VIEW DISPLAY EMPLOYING A LIQUID CRYSTAL HAVING A CHARACTERISTIC WAVELENGTH IN THE NON-VISIBLE SPECTRUM

TECHNICAL FIELD OF THE INVENTION

The present invention is directed, in general, to liquid crystal displays and, more specifically, to reflective, transmissive and transflective black-and-white and color cholesteric liquid crystal displays.

BACKGROUND OF THE INVENTION

The development of improved low-power-consumption flat-panel liquid crystal displays (LCDs) is an area of very active research, driven in large part by the proliferation of and demand for portable electronic appliances, including computers and wireless telecommunications devices. Moreover, as the quality of LCDs improve, and the cost of manufacturing declines, it is projected that LCDs may eventually displace conventional display technologies, such as cathode-ray-tubes.

Cholesteric liquid crystal ("CLC") technology is a particularly attractive candidate for many display applications. CLC displays can be used to provide bi-stable and multi-stable displays that, due to their non-volatile "memory" characteristic, do not require a continuous driving circuit to maintain a display image, thereby significantly reducing power consumption. Moreover, some CLC displays can be easily viewed in ambient light without the need for back-lighting; such displays are referred to as "reflective" mode displays, while those requiring a back-light are referred to as "transmissive" mode displays. The elimination of the need for back-lighting is particularly significant in that lighting requirements typically represent approximately 90% of the total power consumption of conventional LC displays. While a reflective mode display is suitable for some applications, and a transmissive mode display is suitable for others, there are certain applications in which it can also be desirable to have a display operable in both reflective and transmissive modes. Therefore, to meet the growing demand for LCDs, there is a need in the art for LCDs operable in reflective, transmissive, and selectable transmissive/reflective modes.

SUMMARY OF THE INVENTION

To address the above-described deficiencies of the prior art, the present invention provides various reverse-mode direct-view liquid crystal displays employing a liquid crystal having a characteristic wavelength to reflect light in the non-visible spectrum, including reflective, transmissive and reflective/transmissive mode displays. In accordance with the principles disclosed, the basic structure of a direct-view liquid crystal display (LCD) includes a front substantially transparent substrate, a rear substrate, and a controllable cholesteric liquid crystal (CLC) disposed between the front and rear substrates and having a characteristic wavelength to reflect light in the non-visible spectrum. Portions of the controllable CLC can selectively exhibit a planar state or a focal-conic state; the portions of the CLC in the planar state appear dark (e.g., black), and the portions of the CLC in the focal-conic state appear bright (e.g., white), to an observer of the LCD. The various reflective, transmissive and reflective-transmissive mode displays are derived by further combinations with linear, circular or near circular polarizers, reflective mirrors and/or transmissive/reflective (i.e., "transflective") mirrors, color matrix reflectors or filters and a source of visible light.

In accordance with the principles of the invention, a direct-view LCD operative in a transmissive mode is constructed by combining with the basic structure a first linear polarizer disposed proximate the front of the LCD; a second linear polarizer disposed proximate the rear of the LCD, the polarity of the second linear polarizer being perpendicular, or nearly perpendicular, to the polarity of the first linear polarizer; and a source of visible light disposed proximate the rear of the LCD, the second linear polarizer being disposed intermediate to the CLC and the source of visible light and operative to linearly polarize the visible light prior to passage of the visible light through the CLC. In operation, i) the portions of the CLC in the planar state allow the transmission of substantially all of the linearly-polarized visible light, which is substantially blocked from view to an observer by the first linear polarizer, whereby the portions of the CLC in the planar state appear dark to an observer of the LCD; and ii) the portions of the CLC in the focal-conic state at least partially alter the polarization of the visible light, causing a portion of the visible light to have a linear polarization parallel to the polarity of, and transmittable through, the first linear polarizer, whereby the portions of the CLC in the focal-conic state appear bright to an observer of the LCD.

In accordance with the principles of the invention, a direct-view LCD operative in a reflective mode is constructed by combining with the basic structure a mirror disposed proximate the rear of the LCD, and a circular, or substantially circular, polarizer disposed proximate the front of the LCD, the circular polarizer operative to at least substantially circularly polarize visible light incident on the front of the LCD. In operation, i) the portions of the CLC in the planar state allow the transmission of substantially all of the circularly-polarized visible light, which is substantially reflected from the mirror and back through the CLC, the reflected visible light having a handedness opposite to that of, and thereby blocked by, the circular polarizer, whereby the portions of the CLC in the planar state appear dark to an observer of the LCD; and ii) the portions of the CLC in the focal-conic state at least partially alter the polarization of the circularly-polarized visible light prior and subsequent to being reflected by the mirror, causing a portion of the visible light to have a circular polarization of the same handedness as, and thus transmittable through, the circular polarizer, whereby the portions of the CLC in the focal-conic state appear bright to an observer of the LCD.

In accordance with the principles of the invention, a direct-view LCD operative in a reflective or transmissive mode is constructed by combining with the basic structure a first circular, or substantially circular, polarizer disposed proximate the front of the CLC, the first circular polarizer having a first handedness; a transmissive/reflective (or "transflective") mirror disposed proximate the rear of the CLC, the transmissive/reflective mirror operative to reflect visible light incident from the front of the LCD and to transmit visible light incident from the rear of the LCD; a second circular, or substantially circular, polarizer disposed proximate the rear of the transflective mirror, the second circular polarizer having a second handedness opposite to the first handedness of the first circular polarizer; and a source of visible light disposed proximate the rear of the second circular polarizer.

In the transmissive mode of operation, the source of visible light is energized, and the second circular polarizer substantially circularly polarizes the visible light. The portions of the CLC in the planar state allow the transmission of substantially all of the circularly-polarized visible light, the circularly-polarized visible light having a handedness opposite to that of, and thereby blocked by, the first circular polarizer, whereby the portions of the CLC in the planar state appear dark to an observer of the LCD. The portions of the CLC in the focal-conic state at least partially alter the polarization of the circularly-polarized visible light, causing a portion of the visible light to have a circular polarization of the same handedness as, and thus transmittable through, the first circular polarizer, whereby the portions of the CLC in the focal-conic state appear bright to an observer of the LCD.

In the reflective mode of operation, the source of visible light is de-energized. The first circular, or substantially circular, polarizer is operative to substantially circularly polarize visible light incident on the front of the LCD. The portions of the CLC in the planar state allow the transmission of substantially all of the circularly-polarized visible light, which is substantially reflected from the transmissive/reflective mirror and back through the CLC, the reflected visible light having a handedness opposite to that of, and thereby blocked by, the first circular polarizer, whereby the portions of the CLC in the planar state appear dark to an observer of the LCD. The portions of the CLC in the focal-conic state at least partially alter the polarization of the circularly-polarized visible light prior and subsequent to being reflected by the transmissive/reflective mirror, causing a portion of the visible light to have a circular polarization of the same handedness as, and thus transmittable through, the first circular polarizer, whereby the portions of the CLC in the focal-conic state appear substantially bright to an observer of the LCD.

The use of a CLC having a characteristic wavelength to reflect non-visible spectrum can provide several advantages over conventional direct-view displays that utilize a CLC having a characteristic wavelength to reflect visible spectrum. For example, a smaller cell gap can be utilized, which reduces the driving voltage necessary to untwist the LC helical structure. The voltage necessary to untwist a CLC helical structure is, in part, a function of the pitch length of the CLC domains; the longer the pitch length, the lower the required driving voltage. Whereas a CLC having a characteristic wavelength to reflect non-visible infra-red spectrum has a longer pitch length that a CLC having a characteristic wavelength to reflect visible spectrum, a lower driving voltage is required. Furthermore, the use of a CLC having a characteristic wavelength to reflect non-visible spectrum yields a display that doesn't depend on multiple LC planar layers for reflection. The bright state of the display depends only on the retarding and depolarizing effect of the CLC in the focal-conic state, which can be achieved with a smaller cell gap (potentially as small as 1 micron) than conventional displays using a CLC having a characteristic wavelength to reflect visible spectrum, which depend on multiple LC planar layers for reflection to yield a bright state.

The foregoing has outlined rather broadly the features and technical advantages of the present invention so that those skilled in the art may better understand the detailed description of the invention that follows. Additional features and advantages of the invention will be described hereinafter that form the subject matter of the claims recited hereinafter. Those skilled in the art should appreciate that they may readily use the conception and the specific embodiments disclosed as a basis for modifying or designing other structures for carrying out the same purposes of the present invention. Those skilled in the art should also realize that such equivalent constructions do not depart from the spirit and scope of the invention in its broadest form, except as limited by the claims recited hereinafter.

BRIEF DESCRIPTION OF THE DRAWINGS

For a more complete understanding of the present invention, and the advantages thereof, reference is now made to the following descriptions taken in conjunction with the accompanying drawings, in which:

FIG. 3-A illustrates a cross-sectional view of a transflective LCD structure, and its operation in a transmissive mode when its liquid crystal is in planar and focal-conic states, in accordance with the principles of the present invention; and FIG. 3-B illustrates a cross-sectional view of a transflective LCD structure, and its operation in a reflective mode when its liquid crystal is in planar and focal-conic states, in accordance with the principles of the present invention.

DETAILED DESCRIPTION

As described with reference to the exemplary embodiments illustrated in FIGS. 1–3, the present invention discloses the heretofore unrecognized capability to construct a direct view LCD utilizing a CLC having an intrinsic reflective wavelength outside the visible spectrum, i.e., by combining a CLC having an intrinsic reflective wavelength, $\lambda_o$, , to reflect in the non-visible spectrum (i.e., either in the infrared, $\lambda_o$=700 to 2000 nm, or ultraviolet, $\lambda_o$=200 to 450 nm, regions) with one or more linear, circular, or substantially circular, polarizers, and a reflective mirror and/or a transflective mirror. The exemplary embodiments specifically disclosed herein include novel back-lit (transmissive), front-lit (reflective), and dual-mode front- or back-lit (transflective) displays.

Figure 1:
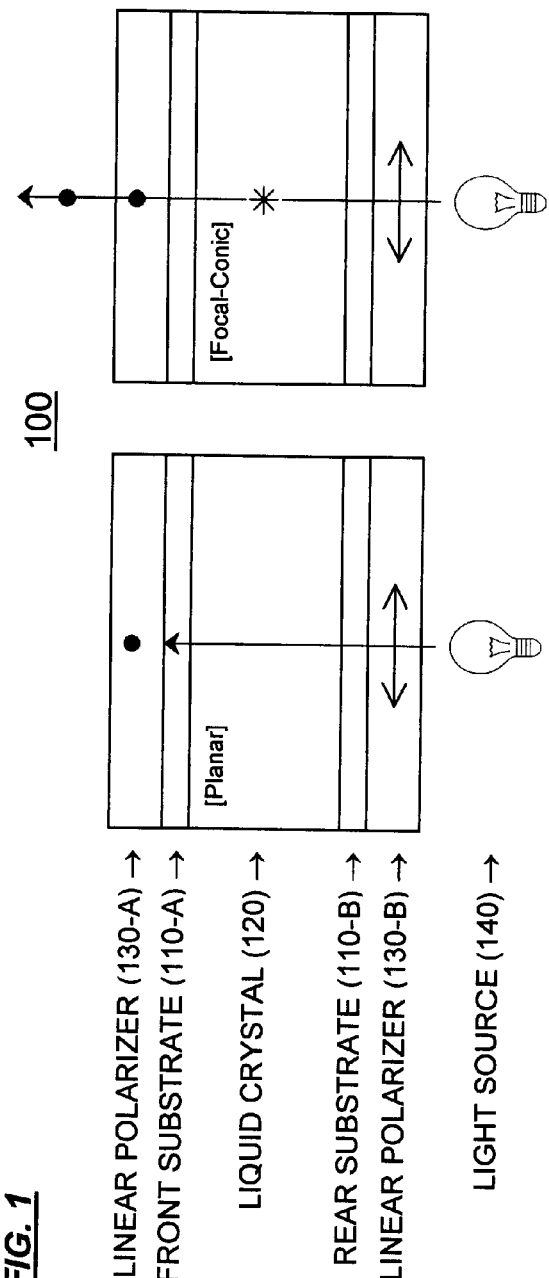
FIG. 1 illustrates a cross-sectional view of a transmissive liquid crystal display (LCD) structure, and its operation when its liquid crystal is in planar and focal-conic states, in accordance with the principles of the present invention.

Referring initially to FIG. 1, illustrated is a cross-sectional view of a transmissive liquid crystal display (LCD) 100, and its operation when its liquid crystal 120 is in planar and focal-conic states, in accordance with the principles of the present invention. The transmissive LCD 100 is constructed by trapping a cholesteric liquid crystal (CLC) 120 between two substrates, front substrate 110-A and rear substrate 110-B. The front and rear substrates 110-A, 110-B are preferably made from substantially transparent materials and have substantially transparent electrodes (not shown) associated therewith. The transparent electrodes, such as indium tin oxide (ITO), are coupled to a driving circuit (not shown) operative to cause the CLC 120 to selectively transform to a planar or focal-conic state. When in the planar state, the CLC 120 will reflect incident light having a wavelength within the intrinsic spectral bandwidth of the CLC, which bandwidth is centered about the intrinsic wavelength, $\lambda_o$, but will allow substantially all incident light having a wavelength outside the intrinsic spectral bandwidth of the CLC to pass through. When in the focal-conic state, however, the CLC 120 is operative to optically retard and scatter, therefore polarizing the incident light at all wavelengths.

Transmissive LCD 100 further includes a linear polarizer 130-A disposed proximate the front of the LCD. In the exemplary embodiment, the linear polarizer 130-A is positioned on the outer surface of the front substrate 110-A; those skilled in the art, however, will recognize that the linear polarizer 130-A alternatively could be positioned on the inner surface of the front substrate 110-A, or the front substrate 110-A could have a linear polarizer integrally formed therewith. The transmissive LCD 100 further includes a linear polarizer 130-B disposed proximate the rear of the LCD. In the exemplary embodiment, the linear polarizer 130-B is positioned on the outer surface of the rear substrate 110-B; those skilled in the art, however, will recognize that the linear polarizer 130-B alternatively could be positioned on the inner surface of the rear substrate 110-B, or the rear substrate 110-B, to provide better reflection and remove any parallax effects, could have a linear polarizer integrally formed therewith.

In accordance with the theory of the present invention, the relative polarities of the linear polarizers 130-A, 130-B should be oriented substantially normal, or perpendicular, to each other. The transmissive LCD 100 includes a light source 140 disposed proximate the rear of the LCD; the light source 140 can be a conventional LCD backlight, such as an electro-luminescent panel.

In operation, light from the light source 140 is linearly polarized as it passes through the rear linear polarizer 130-B. According to the principles of the present invention, the polarization property of the visible light is substantially unaffected as it passes through the CLC 120 in the planar state, because the intrinsic bandwidth of the CLC is in the non-visible spectrum. The visible light passing through the CLC 120 in the planar state will maintain substantially the same direction of polarization, and will be blocked by the front linear polarizer 130-A, which has a direction of polarization non-parallel to the direction of polarization of the light passing through the CLC 120. Therefore, an observer of the transmissive LCD 100 will observe a dark state corresponding to portions of the CLC 120 in the planar state. Because of the retardation and depolarization effect of the focal-conic structure, however, the polarization of visible light is partially altered as it passes through portions of the CLC 120 in the focal-conic state. At least a portion of the partially-altered light will have a linear polarity oriented parallel to the orientation of linear polarizer 130-A, and will thus pass through. Therefore, an observer of the transmissive LCD 100 will observe a bright state corresponding to portions of the CLC 120 in the focal-conic state.

Figure 2:
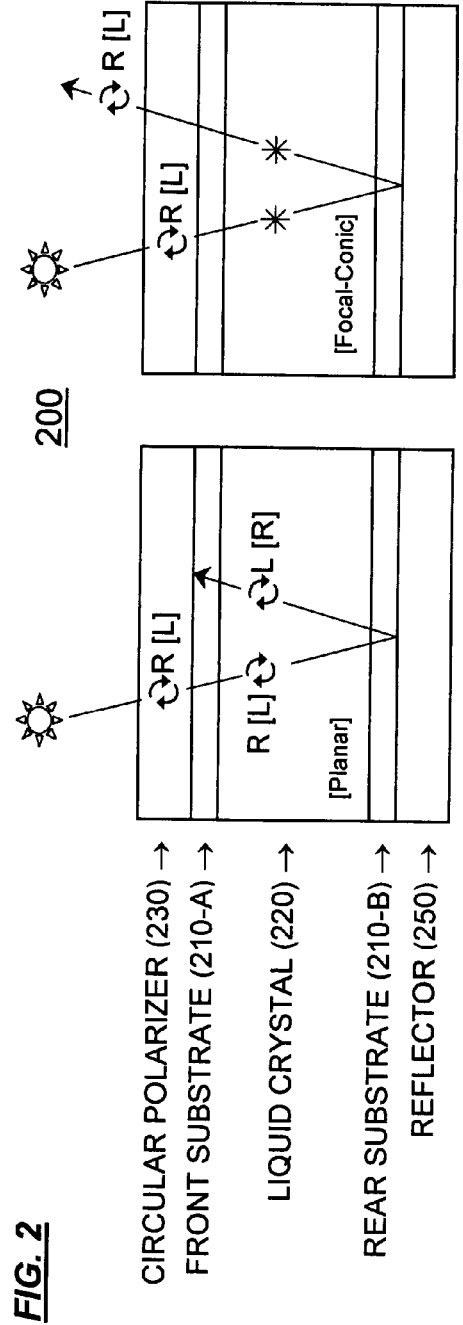
FIGS. 2 illustrates a cross-sectional view of a reflective LCD structure, and its operation when its liquid crystal is in planar and focal-conic states, in accordance with the principles of the present invention.

Turning now to FIG. 2, illustrated is a cross-sectional view of a reflective LCD 200, and its operation when its liquid crystal 220 is in planar and focal-conic states, in accordance with the principles of the present invention. The reflective LCD 200 is constructed by trapping a cholesteric liquid crystal (CLC) 220 between two substrates, front substrate 210-A and rear substrate 210-B. The front and rear substrates 210-A, 210-B can be made from substantially transparent materials and have substantially transparent electrodes (not shown) associated therewith. The transparent electrodes, such as indium tin oxide (ITO), are coupled to a driving circuit (not shown) operative to cause the CLC 220 to selectively transform to a planar or focal-conic state. When in the planar state, the CLC 220 will reflect incident light having a wavelength within the intrinsic spectral bandwidth of the CLC, which bandwidth is centered about the intrinsic wavelength, $\lambda_o$, but will allow substantially all incident light having a wavelength outside the intrinsic spectral bandwidth of the CLC to pass through. When in the focal-conic state, however, the CLC 220 is operative to optically retard and scatter, therefore polarizing the incident light at all wavelengths.

Reflective LCD 200 further includes a circular polarizer 230 disposed proximate the front of the LCD. In the exemplary embodiment, the circular polarizer 230 is positioned on the outer surface of the front substrate 210-A; those skilled in the art, however, will recognize that the circular polarizer 230 alternatively could be positioned on the inner surface of the front substrate 210-A, or the front substrate 210-A could have a circular polarizer integrally formed therewith.

The reflective LCD 200 further includes a reflector 250 disposed proximate the rear of the LCD. In the exemplary embodiment, the reflector 250 is positioned on the outer surface of the rear substrate 210-B; those skilled in the art, however, will recognize that the reflector 250 alternatively could be positioned on the inner surface of the rear substrate 210-B, or the rear substrate 210-B could have a reflector integrally formed therewith; e.g., rear substrate 210-B does not need to be transparent, but can have a reflective front (or inner) surface to minimize parallax effects. Furthermore, the reflector 250 can have a colored surface, such that the reflected light appears to an observer to have substantially the same color as the reflector; different portions (or "pixels") of the display could have different colored reflectors, whereby a multi-color display can be provided. Alternatively, a color filter can be used to provide a single or multi-color display.

In operation, visible light incident on the front of the LCD 200 is circularly polarized as it passes through the circular polarizer 230; the polarity of the light is either right- (R) or left-hand (L) circularly polarized, as a function of the handedness of circular polarizer 230. According to the principles of the present invention, the polarization property of the incident visible light is substantially unaffected as it passes through the CLC 220 in the planar state, because the intrinsic bandwidth of the CLC is in the non-visible spectrum. The visible light passing through the CLC 220 in the planar state will maintain substantially the same polarization, until it is reflected by reflector 250, which will cause the handedness of the circular polarity to be reversed. In other words, if the circular polarizer 230 has right-hand (R) circular polarity, the visible light reflected by reflector 250 will have left-hand (L) circular polarity, and vice versa. Because the circular polarity of the visible light transmitted through CLC 220 is reversed upon reflection from reflector 230, circular polarizer 230 will block the transmitted visible light Therefore, an observer of the reflective LCD 200 will observe a dark state corresponding to portions of the CLC 220 in the planar state. Because of the retardation and depolarization effect of the focal-conic structure, however, the polarization of incident visible light is partially altered as it passes through portions of the CLC 220 in the focal-conic state, both prior and subsequent to reflection by reflector 250. At least a portion of the partially-altered light will have a circular polarity having the same handedness as circular polarizer 230, and will thus pass through. Therefore, an observer of the reflective LCD 200 will observe a bright state corresponding to portions of the CLC 220 in the focal-conic state.

Turning now to FIG. 3-A, illustrated is a cross-sectional view of a transflective LCD 300, and its operation in a transmissive mode when its liquid crystal 320 is in planar and focal-conic states, in accordance with the principles of the present invention. The transflective LCD 300 is constructed by trapping a cholesteric liquid crystal (CLC) 320 between two substrates, front substrate 310-A and rear substrate 310-B. The front and rear substrates 310-A, 310-B are preferably made from substantially transparent materials and have substantially transparent electrodes (not shown) associated therewith. The transparent electrodes, such as indium tin oxide (ITO), are coupled to a driving circuit (not shown) operative to cause the CLC 320 to selectively transform to a planar or focal-conic state. When in the planar state, the CLC 320 will reflect incident light having a wavelength within the intrinsic spectral bandwidth of the CLC, which bandwidth is centered about the intrinsic wavelength, $\lambda_0$, but will allow substantially all incident light having a wavelength outside the intrinsic spectral bandwidth of the CLC to pass through. When in the focal-conic state, however, the CLC 320 is operative to retard and depolarize the incident light, optically retarding and scattering all wavelengths.

Transflective LCD 300 further includes a circular polarizer 330-A disposed proximate the front of the LCD. In the exemplary embodiment, the circular polarizer 330-A is positioned on the outer surface of the front substrate 310-A; those skilled in the art, however, will recognize that the circular polarizer 330-A alternatively could be positioned on the inner surface of the front substrate 310-A, or the front substrate 310-A could have a circular polarizer integrally formed therewith. The transflective LCD 300 further includes a transflective mirror 340 disposed proximate the rear of the LCD; the transflective mirror 340 is operative to reflect incident light from the front of LCD 300, while being operative to transmit incident light from the rear. In the exemplary embodiment, the transflective mirror 340 is positioned on the outer surface of the rear substrate 310-B; those skilled in the art, however, will recognize that the transflective mirror 340 alternatively could be positioned on the inner surface of the rear substrate 310-B, or the rear substrate 310-B could have a transflective mirror integrally formed therewith. Furthermore, the transflective mirror 340 can have a colored surface, such that reflected light appears to an observer to have substantially the same color as the transflective mirror; different portions (or "pixels") of the display could have different colored transflective mirrors, whereby a multi-color display can be provided. Alternatively, a color filter can be used to provide a single or multi-color display.

Transflective LCD 300 further includes a circular polarizer 330-B disposed proximate the rear of the transflective mirror 340, the circular polarizer 330-B having a handedness opposite to the handedness of the circular polarizer 330-A. Lastly, the transflective LCD 300 includes a light source 350 disposed proximate the rear of the circular polarizer 330-B; the light source 350 can be a conventional LCD backlight, such as an electro-luminescent panel.

Optionally, to enhance the efficiency of the light source 350, the LCD 300 can further include a mirror 360 disposed proximate the rear of light source 350. The mirror 360 will reverse the polarity of the light that is blocked by the rear circular polarizer 330-B, thus allowing the light to pass through. In such a way, the light generated by light source 350 is recycled, and the percentage of light transmission through the circular polarizer 330-B is increased.

In the transmissive mode of operation of LCD 300, the light source 350 is energized, and light from the light source 350 is circularly polarized as it passes through the rear circular polarizer 330-B, prior to passing through transflective mirror 340 and into CLC 320. According to the principles of the present invention, the polarization property of the visible light is substantially unaffected as it passes through the CLC 320 in the planar state, because the intrinsic bandwidth of the CLC is in the non-visible spectrum. The visible light passing through portions of the CLC 320 in the planar state will maintain substantially the same circular polarity, and will be blocked by the front circular polarizer 330-A, which has a circular polarity handedness opposite to the handedness of the rear circular polarizer 330-B. Therefore, an observer of the LCD 300 operating in the transmissive mode will observe a dark state corresponding to portions of the CLC 320 in the planar state. Because of the retardation and depolarization effect of the focal-conic structure, however, the polarization of visible light is partially altered as it passes through portions of the CLC 320 in the focal-conic state. At least a portion of the partially-altered light will have a circular polarity handedness corresponding to the handedness of circular polarizer 330-A, and will thus pass through. Therefore, an observer of LCD 300 operating in the transmissive mode will observe a bright state corresponding to portions of the CLC 320 in the focal-conic state.

Turning now to FIG. 3-B, illustrated is a cross-sectional view of the transflective LCD 300, and its operation in a reflective mode when its liquid crystal is in planar and focal-conic states, in accordance with the principles of the present invention. In the transmissive mode of operation of LCD 300, the light source 350 is de-energized. Visible light incident on the front of the LCD 300 is circularly polarized as it passes through the circular polarizer 330-A; the polarity of the light is either right- (R) or left-hand (L) circularly polarized, as a function of the handedness of circular polarizer 330-A. According to the principles of the present invention, the polarization property of the incident visible light is substantially unaffected as it passes through the CLC 320 in the planar state, because the intrinsic bandwidth of the CLC is in the non-visible spectrum. The visible light passing through the CLC 320 in the planar state will maintain substantially the same handedness of polarization of circular polarizer 330-A, until it is reflected by transflective mirror 340, which will cause the handedness of the circular polarity to be reversed. In other words, if the circular polarizer 330-A has right-hand (R) circular polarity, the visible light reflected by transflective mirror 340 will have left-hand (L) circular polarity, and vice versa. Because the circular polarity of the visible light transmitted through CLC 320 is reversed upon reflection from transflective mirror 340, circular polarizer 330-A will block the transmitted visible light. Therefore, an observer of the LCD 300 operating in the reflective mode will observe a dark state corresponding to portions of the CLC 320 in the planar state. Because of the retardation and depolarization effect of the focal-conic structure, however, the polarization of incident visible light is partially altered as it passes through portions of the CLC 320 in the focal-conic state, both prior and subsequent to reflection by transflective mirror 340. At least a portion of the partially-altered light will have a circular polarity having the same handedness as circular polarizer 330-A, and will thus pass through. Therefore, an observer of the LCD 300 operating in the reflective mode will observe a bright state corresponding to portions of the CLC 320 in the focal-conic state. Furthermore, as noted previously, the transflective mirror 340 can have a colored surface, such that reflected light appears to an observer to have substantially the same color as the transflective mirror; different portions (or "pixels") of the display could have different colored transflective mirrors, whereby a multi-color display can be provided. Alternatively, a color filter can be used to provide a single or multi-color display.

From the foregoing detailed description, it is apparent that the present application discloses novel reverse-mode direct-view liquid crystal displays employing liquid crystal having a characteristic wavelength to reflect light in the non-visible spectrum, including reflective, transmissive and transflective displays. Although the present invention and its advantages have been described in detail, those skilled in the art should understand that they can make various changes, substitutions and alterations herein without departing from the spirit and scope of the invention in its broadest form.

We claim:

1. A direct-view liquid crystal display (LCD) operative in a reflective mode, comprising:
   a front substantially transparent substrate;
   a rear substrate;
   a controllable cholesteric liquid crystal (CLC) disposed between said front and rear substrates and having a characteristic wavelength in the non-visible spectrum, portions of said controllable CLC selectively exhibiting a planar state or a focal-conic state, said portions of said CLC in said planar state appearing dark to an observer of said LCD and said portions of said CLC in said focal-conic state appearing bright to an observer of said LCD;
   a mirror disposed proximate said rear of said LCD; and
   a circular or elliptical polarizer disposed proximate said front of said LCD, said circular or elliptical polarizer operative to circularly or elliptically polarize visible light incident on said front of said LCD, wherein:
   i) said portions of said CLC in said planar state allow the transmission of substantially all of said circularly- or elliptically-polarized visible light, which is substantially reflected from said mirror and back through said CLC; said reflected visible light having a handedness opposite to that of, and thereby blocked by, said circular or elliptical polarizer, whereby said portions of said CLC in said planar state appear dark to an observer of said LCD; and
   ii) said portions of said CLC in said focal-conic state at least partially depolarize said circularly- or elliptically-polarized visible light prior and subsequent to being reflected by said mirror; a portion of said partially-depolarized visible light having a circular or elliptical polarization of the same handedness as, and thus transmittable through, said circular or elliptical polarizer, whereby said portions of said CLC in said focal-conic state appear bright to an observer of said LCD.

2. The direct-view LCD recited in claim 1, wherein said mirror is disposed on the inner surface of said rear substrate.

3. The direct-view LCD recited in claim 1, wherein said mirror is integrally formed with said rear substrate.

4. The direct-view LCD recited in claim 1, wherein said circular or elliptical polarizer is disposed on the outer surface of said front substrate.

5. The direct-view LCD recited in claim 1, wherein said circular or elliptical polarizer is integrally formed with said front substrate.

6. The direct-view LCD recited in claim 1, further comprising an alignment layer on the inner surface of each of said front and rear substrates, said alignment layer on the inner surface of said front substrate having an alignment direction substantially opposite to the alignment direction of the alignment layer on the inner surface of said second substrate.

7. The direct-view LCD recited in claim 1, wherein said characteristic wavelength of said CLC is in the infrared region.

8. The direct-view LCD recited in claim 1, wherein said characteristic wavelength of said CLC is in the ultraviolet region.

9. A direct-view liquid crystal display (LCD) selectively operative in a reflective or transmittive mode, comprising:
   a front substantially transparent substrate;
   a rear substrate;
   a controllable cholesteric liquid crystal (CLC) disposed between said front and rear substrates and having a characteristic wavelength in the non-visible spectrum, portions of said controllable CLC selectively exhibiting a planar state or a focal-conic state, said portions of said CLC in said planar state appearing dark to an observer of said LCD and said portions of said CLC in said focal-conic state appearing bright to an observer of said LCD;
   a first circular or elliptical polarizer disposed proximate the front of said CLC, said circular or elliptical polarizer having a first handedness;
   a transflective mirror disposed proximate the rear of said CLC, said transflective mirror operative to reflect visible light incident from the front of said LCD and to transmit visible light incident from the rear of said LCD;
   a second circular or elliptical polarizer disposed proximate the rear of said transflective mirror, said circular or elliptical polarizer having a second handedness opposite to said first handedness of said first circular or elliptical polarizer; and
   a source of visible light disposed proximate the rear of said second circular or elliptical polarizer, wherein:
   1) when said source of visible light is energized, said LCD operates in said transmissive mode, in which said visible light is circularly- or elliptically-polarized by said second circular or elliptical polarizer, and wherein:
      i) said portions of said CLC in said planar state allow the transmission of substantially all of said circularly- or elliptically-polarized visible light, said circularly- or elliptically-polarized visible light having a handedness opposite to that of, and thereby blocked by, said first circular or elliptical polarizer, whereby said portions of said CLC in said planar state appear dark to an observer of said LCD; and
      ii) said portions of said CLC in said focal-conic state at least partially depolarize said circularly- or elliptically-polarized visible light, a portion of said partially-depolarized visible light having a circular or elliptical polarization of substantially the same handedness as, and thus transmittable through, said first circular or elliptical polarizer, whereby said portions of said CLC in said focal-conic state appear bright to an observer of said LCD; and
   2) when said source of visible light is de-energized, said LCD operates in said reflective mode, in which said first circular or elliptical polarizer is operative to circularly or elliptically polarize visible light incident on said front of said LCD, and wherein:
      i) said portions of said CLC in said planar state allow the transmission of substantially all of said circularly- or elliptically-polarized visible light, which is substantially reflected from said transflective mirror and back through said CLC; said reflected visible light having a handedness opposite to that of, and thereby blocked by, said first circular or elliptical polarizer, whereby said portions of said CLC in said planar state appear dark to an observer of said LCD; and
      ii) said portions of said CLC in said focal-conic state at least partially depolarize said circularly- or elliptically-polarized visible light prior and subsequent to being reflected by said transflective mirror; a portion of said partially-depolarized visible light having a circular or elliptical polarization of the same handedness as, and thus transmittable through, said first circular or elliptical polarizer, whereby said portions of said CLC in said focal-conic state appear bright to an observer of said LCD.

10. The direct-view LCD recited in claim 9, wherein said first circular or elliptical polarizer is disposed on the outer surface of said front substrate.

11. The direct-view LCD recited in claim 9, wherein said first circular or elliptical polarizer is integrally formed with said front substrate.

12. The direct-view LCD recited in claim 9, wherein said transflective mirror is disposed on the inner surface of said rear substrate.

13. The direct-view LCD recited in claim 9, wherein said transflective mirror is integrally formed with said rear substrate.

14. The direct-view LCD recited in claim 9, further comprising an alignment layer on the inner surface of each of said front and rear substrates, said alignment layer on the inner surface of said front substrate having an alignment direction substantially opposite to the alignment direction of the alignment layer on the inner surface of said second substrate.

15. The direct-view LCD recited in claim 9, wherein said characteristic wavelength of said CLC is in the infrared region.

16. The direct-view LCD recited in claim 9, wherein said characteristic wavelength of said CLC is in the ultraviolet region.

* * * * *